(12) United States Patent
Li et al.

(10) Patent No.: US 12,348,324 B1
(45) Date of Patent: Jul. 1, 2025

(54) METHOD FOR NETWORKING A PLURALITY OF POWER BATTERY PACKS VIA CAN BUS

(71) Applicant: UBETTER Technology Company Limited, Guangdong (CN)

(72) Inventors: Jie Li, Guangdong (CN); Xuefeng Cai, Guangdong (CN)

(73) Assignee: UBETTER Technology Company Limited, Guangdong (CN)

( * ) Notice: Subject to any disclaimer, the term of this patent is extended or adjusted under 35 U.S.C. 154(b) by 2 days.

(21) Appl. No.: 18/616,619

(22) Filed: Mar. 26, 2024

(51) Int. Cl.
*H04L 12/10* (2006.01)

(52) U.S. Cl.
CPC ..................................... *H04L 12/10* (2013.01)

(58) Field of Classification Search
CPC .................. H04L 2012/40215; H04L 61/5038
See application file for complete search history.

(56) References Cited

U.S. PATENT DOCUMENTS

2014/0091769 A1* 4/2014 Kim ...................... H02J 7/0013
320/134
2022/0217118 A1* 7/2022 Hwang ............... H04L 61/5038
2023/0063402 A1* 3/2023 Xhafa ..................... B60L 58/21
2024/0326597 A1* 10/2024 Lu ........................ H01M 10/441

FOREIGN PATENT DOCUMENTS

CN 113497745 A * 10/2021

* cited by examiner

*Primary Examiner* — Hee Soo Kim
(74) *Attorney, Agent, or Firm* — Cooper Legal Group, LLC

(57) ABSTRACT

The present disclosure relates to a method for networking a plurality of power battery packs via a CAN bus, each battery pack is provided with an independent BMS. The method includes: waking up the BMS to monitor the CAN bus; transmitting, by the BMS, a network access request to a server if the BMS receives a query packet within a preset first time period; otherwise, transmitting, by the BMS, a control request to other BMSs. The query packet is transmitted by the BMS currently serving as a server for querying a voltage of a battery pack corresponding to other BMSs; transmitting a network access request includes: waiting, by the BMS, for a first random duration, generating a frame ID according to the voltage of the corresponding battery pack, transmitting a data packet for requesting to allocate an ID to the server, and becoming a client after receiving the allocated ID.

10 Claims, 3 Drawing Sheets

METHOD FOR NETWORKING A PLURALITY OF POWER BATTERY PACKS VIA CAN BUS

TECHNICAL FIELD

The present disclosure relates to the technical field of power battery applications, and in particular to a method for networking a plurality of power battery packs via a Controller Area Network (CAN) bus.

BACKGROUND ART

The power battery pack is a battery module composed of a plurality of individual cells connected in series. Due to the inconsistent capacity of individual cells in the power battery pack, the battery pack will be unbalanced after several charge and discharge cycles. In order to better achieve real-time monitoring of battery physical parameters, battery state estimation, on-line diagnosis and early warning, charge and discharge and pre-charging control, equalization management and thermal management monitoring of the power battery pack, each power battery pack is provided with a BATTERY MANAGEMENT SYSTEM (BMS) for unified management.

In practice, it is sometimes necessary to network a plurality of power battery packs via a CAN bus to uniformly manage the charging, discharging, etc. processes of the power battery packs. In the related art, a unique identifier is usually set in advance for a BMS corresponding to each power battery pack; each BMS transmits data to a CAN bus using its unique identifier as a frame ID; and one of the BMSs is selected as a server according to a certain method, and the remaining BMS is used as a client. This method requires a separate setting of each BMS before networking in order to set its unique identifier, which is obviously cumbersome in the case of a large number of power battery packs requiring networking.

SUMMARY

In order to solve the above-mentioned problems in the prior art, the present disclosure provides a method for networking a plurality of power battery packs via a CAN bus to improve networking efficiency.

The present disclosure provides a method for networking a plurality of power battery packs via a CAN bus, where each battery pack is provided with an independent BMS, the method including:
  waking up the BMS to monitor the CAN bus;
  transmitting, by the BMS, a network access request to a server if the BMS receives a query packet within a preset first time period; where the query packet is transmitted by the BMS currently serving as a server for querying a voltage of a battery pack corresponding to other BMSs;
  otherwise, transmitting, by the BMS, a control request to other BMSs;
  where
  the transmitting the network access request comprises:
  waiting, by the BMS, for a first random duration, generating a frame ID according to the voltage of the corresponding battery pack, and transmitting a data packet for requesting to allocate an ID to the server;
  if the BMS receives an allocated ID within a preset second time period, the BMS becomes a client and uses the allocated ID as a frame ID for subsequently transmitting data;

the transmitting the control request comprises:
  waiting, by the BMS, for a second random duration, generating a frame ID according to the voltage of the corresponding battery pack, and transmitting a data packet for requesting a control right to other BMSs;
  if the BMS does not receive a control right conflict indication packet within a preset third time period, the BMS acquires a control right as a server, and uses a preset server ID as a frame ID for subsequently transmitting data.

Preferably, after the BMS transmits a data packet to the server for requesting the server to allocate an ID, the method further includes:
  re-executing, by the BMS, the step of transmitting a network access request if the BMS receives an ID conflict indication packet;
  re-executing, by the BMS, the step of transmitting the network access request if the BMS does not receive an allocated ID within a preset second time period.

Preferably, after the BMS becomes a client and uses the allocated ID as a frame ID for subsequently transmitting data, the method further includes:
  returning, by the client, the ID conflict indication packet based on a source address of a data packet, if the client receives the data packet for requesting to allocate an ID transmitted by other BMSs, and the source address of the data packet is the same as an ID of the client.

Preferably, after the BMS becomes a client and uses the allocated ID as a frame ID for subsequently transmitting data, the method further includes:
  collecting, by the client, voltage of the corresponding battery pack and transmitting the voltage to the server, if the client receives the query packet within the preset first time period;
  otherwise, performing, by the client, the step of transmitting the control request.

Preferably, after the transmitting the control request, the method further includes:
  executing, by the BMS, the step of transmitting the network access request, if the BMS receives a control right conflict indication packet within the preset third time period.

Preferably, after the BMS acquires a control right to become a server, and uses a preset server ID as a frame ID for subsequently transmitting data, the method further includes:
  returning, by the server, an allocated unique ID based on a frame ID in the data packet, and adding the allocated unique ID to a client list, if the server receives a data packet for requesting to allocate an ID.

Preferably, after the BMS acquires a control right to become a server, and uses a preset server ID as a frame ID for subsequently transmitting data, the method further includes:
  transmitting, by the server, the query packet to the CAN bus every preset query time interval, where the preset query time interval is less than the preset first time period;
  for a client which returns a voltage value within the preset third time period, the server records the voltage value into the client list;
  for a client that does not return a voltage value within the preset third time period, the server deletes the client from the client list.

Preferably, after the BMS acquires a control right to become a server, and uses a preset server ID as a frame ID for subsequently transmitting data, the method further includes:

returning, by the server, the control right conflict indication packet based on a frame ID in the data packet, if the server receives a data packet for requesting a control right.

Preferably, when discharging is required, the server transmits a control instruction according to the voltage of a battery pack corresponding to the server and the voltage of a battery pack corresponding to each client in the client list to successively turn on discharging switches of the battery packs corresponding to each BMS in an order of the voltages from high to low.

When charging is required, the server transmits a control instruction according to the voltage of a battery pack corresponding to the server and the voltage of a battery pack corresponding to each client in the client list to successively turn on charging switches of the battery packs corresponding to each BMS in an order of the voltages from low to high.

Preferably, the first random duration and the second random duration are both controlled within a preset time range;

generating a frame ID according to the voltage of the corresponding battery pack, comprising:
acquiring, by the BMS, a voltage value of a battery pack corresponding to the BMS; and
generating, by the BMS, the frame ID according to the acquired voltage value and a preset ID range.

The present disclosure has the following advantageous effects:

the method for networking a plurality of power battery packs via a CAN bus provided by the present disclosure includes: waking up the BMS to monitor the CAN bus; transmit by the BMS a network access request to the server in an attempt to access the network as a client, if the BMS receives a query packet transmitted by the server within a preset first time period; otherwise, transmitting, by the BMS, a control request to other BMSs in an attempt to access the network as a server. Each BMS waits for a first random duration before transmitting a network access request and for a second random duration before transmitting a control request, effectively avoiding a CAN bus congestion problem that may be caused when a plurality of BMSs are woken up simultaneously. In addition, before transmitting a network access request or a control request, each BMS generates a frame ID according to the voltage of a battery pack corresponding to the current BMS, eliminating the cumbersome step of presetting an ID, and improving networking efficiency.

After transmitting a network access request, a certain BMS re-transmits a network access request if receiving ID conflict indication packets transmitted by other BMSs. When the network access request is retransmitted, since the BMS collects the voltage of the corresponding battery pack again, there is a great probability that the voltage value is different from that of the previous time, and thus the network access request retransmitted will use a new frame ID; after the BMS becomes a client, if a data packet for requesting to allocate an ID transmitted by other BMSs is received, and the source address of the data packet is the same as an ID of the current client, an ID conflict indication packet is returned based on the source address of the data packet, to inform another party of the occurrence of an ID conflict. In addition, the server is reserved with a preset server ID. Through the above means, the present disclosure effectively solves the problem of possible ID conflicts on the CAN bus.

The client collects the voltage of the corresponding battery pack and transmits the voltage to the CAN bus if the client receives the query packet within a preset first time period; if the client does not receive the query packet within the preset first time period, indicating that the server is separated from the CAN bus, the current client attempts to change its identity to be a server, thus transmitting a control request. Through the above means, the present disclosure ensures that a server is always present on the CAN bus.

After transmitting the control request, if the BMS receives a control right conflict indication packet within a preset third time period, indicating that there is an existing server on the bus, the current BMS transmits a network access request in an attempt to access the network with the identity of a client. After becoming the server, if a data packet for requesting a control right is received, a control right conflict indication packet is returned based on a frame ID in the data packet, and another party is informed that there has already been an existing server. Through the above means, the present disclosure effectively avoids the possibility of a plurality of servers on the CAN bus.

If a server receives a data packet for requesting to allocate an ID, an allocated unique ID is returned based on a frame ID in the data packet, and the allocated unique ID is added to a client list; the server transmits a query packet to the CAN bus every preset query time interval; for a client which returns a voltage value within a preset third time period, the server records the voltage value of the client into a client list; and for a client which does not return a voltage value, the server deletes the client from the client list. In addition, when charging or discharging is required, the server may turn on the charging switch or the discharging switch of each battery pack in order according to the magnitude of the voltage value in the client list. Through the above means, the server can centrally manage all the clients on the CAN bus, improving the working efficiency.

DETAILED DESCRIPTION

Preferred embodiments of the present disclosure will be described below with reference to the accompanying drawings. It should be understood by a person skilled in the art that these embodiments are only for explaining technical principles of the present disclosure, and are not intended to limit the scope of the present disclosure.

In order that the objects, aspects and advantages of the embodiments of the present disclosure will become more apparent, a more complete description of the embodiments of the present disclosure will be rendered by reference to the accompanying drawings which illustrate, by way of example, some, but not all embodiments of the present disclosure. Based on the embodiments of the present application, all other embodiments obtained by a person skilled in the art without inventive effort fall within the scope of the present disclosure.

It should be noted that in the description of the present disclosure, the terms "first" and "second" are merely used for convenience of description and are not intended to indicate or imply a relative importance of the devices, elements or parameters, and thus should not be construed as limiting the present disclosure. In addition, in the present disclosure, the term "and/or" is merely an association relationship describing an associated object, indicating that there may be three relationships, for example, A and/or B may indicate that: there are three cases of A alone, A and B together, and B alone. In addition, the word "/" herein, unless specifically stated otherwise, generally indicates that the associated object is an "or" relationship.

Figure 1:
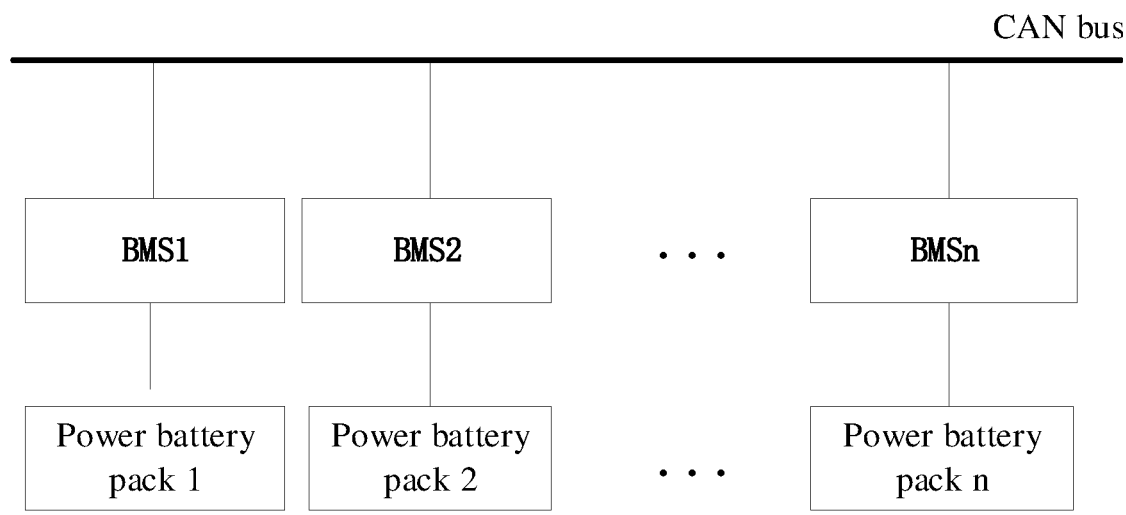
FIG. 1 is a schematic structural diagram showing a network composed of a plurality of power battery packs via a CAN bus according to the present disclosure.

FIG. 1 is a schematic structural diagram showing a network composed of a plurality of power battery packs via a CAN bus according to the present disclosure. As shown in FIG. 1, each power battery pack is correspondingly provided with an independent BMS, and n power battery packs access the CAN bus via respective BMSs. It is possible to set one of the BMSs as a server and other BMSs as a client, and form the n BMSs into a network via the CAN bus, so that the BMS as a server can uniformly manage the charging, discharging, etc. operations of all the power battery packs on the CAN bus.

Figure 2:
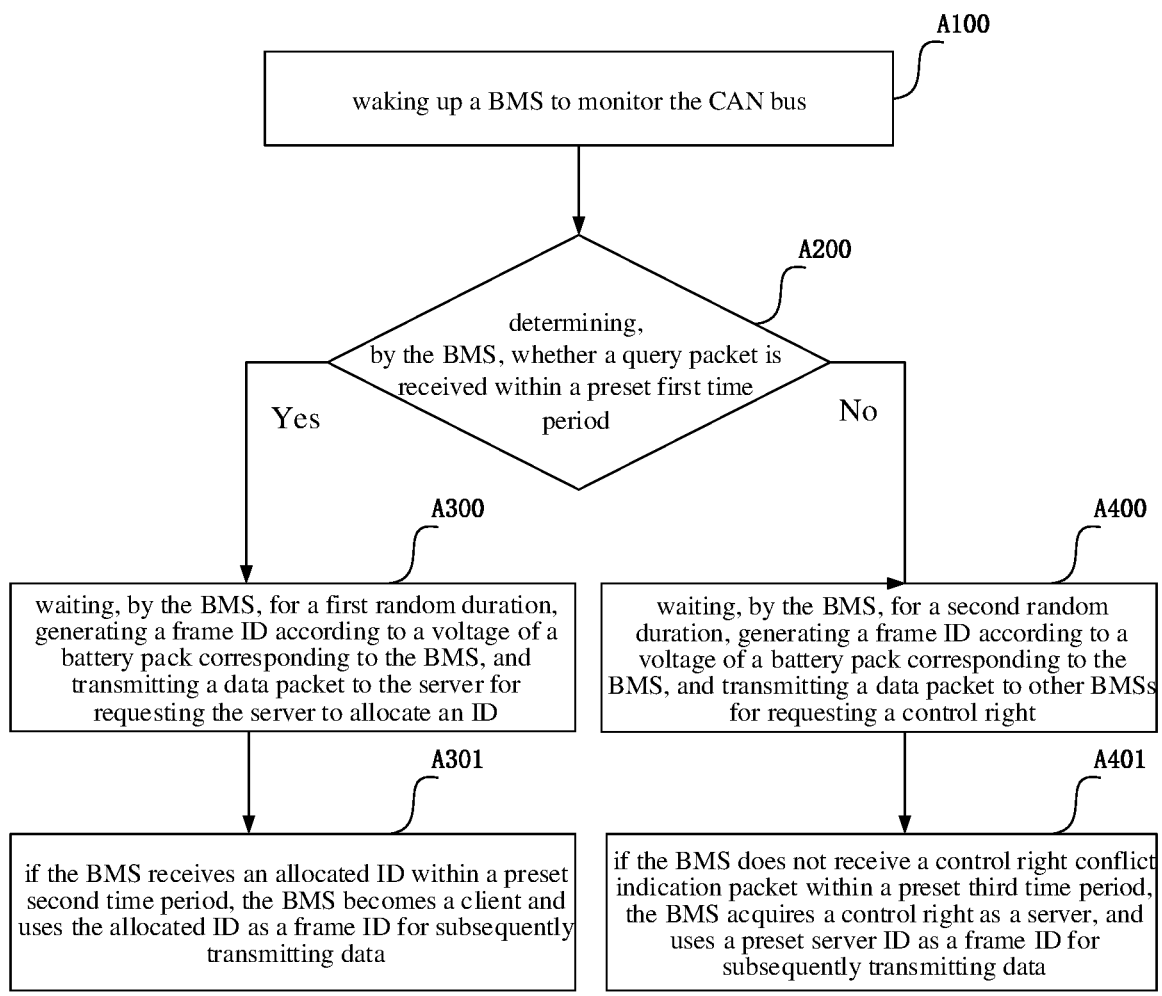
FIG. 2 is a schematic diagram showing the main steps of a first embodiment of a method for networking a plurality of power battery packs via a CAN bus according to the present disclosure.

FIG. 2 is a schematic diagram showing the main steps of a first embodiment of a method for networking a plurality of power battery packs via a CAN bus according to the present disclosure. Each BMS performs the method shown in FIG. 2, and as shown in FIG. 2, the method of the present implementation includes steps A100-A300:

step A100: waking up a BMS to monitor the CAN bus;
step A200: determining, by the BMS, whether a query packet is received within a preset first time period, and if so, proceeding to step A300; otherwise, proceeding to step A400.

The query packet is transmitted by the BMS currently serving as a server for querying a voltage of a battery pack corresponding to other BMSs. If the current BMS receives the query packet, it indicates that there has been a BMS on the CAN bus which has acquired the control right and becomes a server, then the current BMS transmits a network access request to the server by executing steps A300-A301, hoping to acquire the ID allocated by the server and access the network with the identity of the client; if the query packet is not received, it indicates that there is no server on the CAN bus, and then the current BMS transmits a control request to other BMSs by performing steps A400-A401, to acquire the right to control other BMSs and become a server.

The preset query time interval can be set according to the requirements of the user, for example, when the user wishes the BMS serving as a server to report the latest voltage value of each power battery pack on the CAN bus every 20 seconds when charging or discharging the power battery pack, and the preset query time interval can be set as 20 seconds. If the current BMS does not receive a query packet within a preset first time period (e.g., 21 seconds), it can be considered that there is no server on the current CAN bus.

Step A300: waiting, by the BMS, for a first random duration, generating a frame ID according to a voltage of a battery pack corresponding to the BMS, and transmitting a data packet to the server for requesting the server to allocate an ID.

Step A301: if the BMS receives an allocated ID within a preset second time period, the BMS becomes a client and uses the allocated ID as a frame ID for subsequently transmitting data.

In the present embodiment, the time length required for the BMS to transmit a data packet for requesting to allocate an ID to receive the ID allocated by the server is calculated through a plurality of trials in advance, and the longest time is taken as a preset second time period.

The data frames of the CAN bus include a frame start, an arbitration segment, a control segment, a data segment, etc. The arbitration segment includes an Identifier (ID), a standard format 11 bit and an extended format 29 bit; the data segment includes a Data Field with a length of 0-64 bit.

In the present embodiment, BMS uses the generated frame ID as the source address, fills in the position of ID in the arbitration segment of the data frame, and sets a preset special number (for example, 0x000000) in the data segment to indicate the network access request.

Step A400: waiting, by the BMS, for a second random duration, generating a frame ID according to a voltage of a battery pack corresponding to the BMS, and transmitting a data packet to other BMSs for requesting a control right.

Step A401: if the BMS does not receive a control right conflict indication packet within a preset third time period, the BMS acquires a control right as a server, and uses a preset server ID as a frame ID for subsequently transmitting data.

The preset server ID is a fixed ID (e.g., 0x55) reserved exclusively for the server and is not allocated to other BMSs.

In the present embodiment, the preset third time period may be set equal to the preset second time period selected in the above-described step A300, or may be set slightly larger than the preset second time period.

Similar to the above network access request, BMS fills the generated frame ID as the source address in the arbitration segment of the data frame where the ID is located, and sets another preset special number (for example, 0x1010101010) in the data segment to indicate the control request.

In steps A300 and A400, the step of generating the frame ID according to the voltage of the corresponding battery pack includes:

(1) BMS acquires a voltage value of a battery pack corresponding to the BMS.
(2) BMS generates a frame ID according to the acquired voltage value and a preset ID range. According to the CAN bus protocol, the identifier takes up 11 bits or 29 bits, and in the present embodiment, 29 bits can be selected in order to avoid ID conflict as far as possible, i.e., the preset ID range is 0-536870911.

If the acquired voltage value exceeds the preset ID range, the BMS may operate according to a preset rule, for example, truncating 29 bits of the voltage value from low to high as a frame ID, or controlling the generated frame ID within the preset ID range through other operations. If the generated frame ID exactly equals the preset server ID, the voltage value shall be avoided being used and be reacquired to generate a new frame ID.

mV is used as a unit of voltage within the BMS, assuming a total of 20 power battery packs, there is a very low chance that the voltages of the two battery packs will be equal. In addition, since the value of each sampling is different for the same battery pack each time AD is sampled, the ID of the BMS can be generated according to the voltage value of the battery pack and used as the frame ID when the BMS performs CAN communication.

In the present embodiment, the BMS waits for a preset first random duration before transmitting a network access request, to avoid that when a plurality of BMSs accessing the CAN bus are woken up at the same time, and when network access requests are transmitted at the same time, CAN bus congestion may occur. Similarly, in order to avoid a plurality of BMSs transmitting control requests at the same time, it is also necessary to wait a preset second random duration before transmitting a control request. In order to avoid waiting too long, both the first random duration and the second random duration are controlled within a preset time range (e.g., 0-10 seconds or 0-15 seconds).

Figure 3:
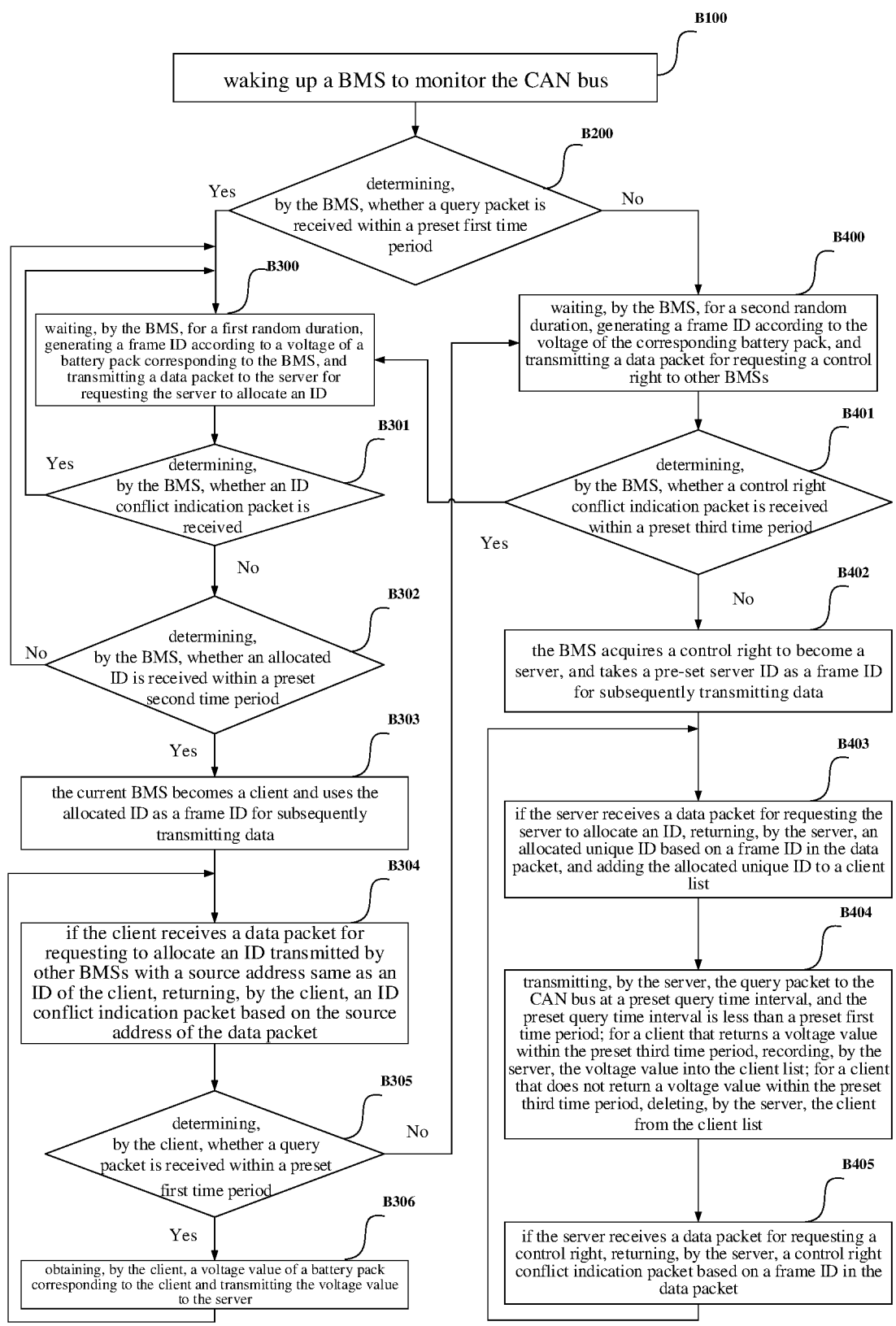
FIG. 3 is a schematic diagram showing the main steps of a second embodiment of a method for networking a plurality of power battery packs via a CAN bus according to the present disclosure.

FIG. 3 is a schematic diagram showing the main steps of a second embodiment of a method for networking a plurality of power battery packs via a CAN bus according to the present disclosure. As shown in FIG. 3, the method for the present embodiment includes steps B100-B407:

Step B100: waking up a BMS to monitor the CAN bus.

Step B200: determining, by the BMS, whether a query packet is received within a preset first time period, and if so, then proceed to step B300; otherwise, proceed to step B400.

The query packet is transmitted by the BMS currently serving as a server for querying a voltage of a battery pack corresponding to other BMSs.

Step B300: waiting, by the BMS, for a first random duration, generating a frame ID according to a voltage of a battery pack corresponding to the BMS, and transmitting a data packet to the server for requesting the server to allocate an ID.

Step B301: determining, by the BMS, whether an ID conflict indication packet is received; if so, then proceed to step B300; otherwise, proceed to step B302.

The ID conflict indication packet is transmitted by another client with the same ID on the CAN bus, and a preset value indicating ID conflict is set in the data segment.

Step B302: determining, by the BMS, whether an allocated ID is received within a preset second time period; if so, then proceed to step B303; otherwise, proceed to step B300.

The data packet to which the ID is allocated is transmitted by the server and includes two parts in the data segment: the beginning portion is provided with a preset value indicating that the frame is used to allocate an ID, followed by a unique ID allocated by the server.

Step B303: the current BMS becomes a client and uses the allocated ID as a frame ID for subsequently transmitting data.

Step B304: if the client receives a data packet for requesting to allocate an ID transmitted by other BMSs with a source address same as an ID of the client, returning, by the client, an ID conflict indication packet based on the source address of the data packet.

Step B305: determining, by the client, whether a query packet is received within a preset first time period, and if so, then proceed to step B306; otherwise, proceed to step B400.

Normally, the server transmits the query packet to the CAN bus every preset query time interval, where the preset query time interval is less than the preset first time period. If a query packet is not received as a client within a preset first time period, indicating that the server is off from access to the CAN bus, the BMS as a client will transmit a control request in an attempt to acquire a control right to become a server.

Step B306: obtaining, by the client, a voltage value of a battery pack corresponding to the client and transmitting the voltage value to the server, and then proceeding to step B304.

Step B400: waiting, by the BMS, for a second random duration, generating a frame ID according to the voltage of the corresponding battery pack, and transmitting a data packet for requesting a control right to other BMSs.

Step B401: determining, by the BMS, whether a control right conflict indication packet is received within a preset third time period; if so, then proceeding to step B300; otherwise, proceeding to step B402.

The control right conflict indication packet is transmitted by an existing server on the CAN bus, and the data segment portion is set with a preset value indicating a control right conflict.

In the present embodiment, the time length the BMS transmits a control request and receives a control right conflict indication packet is counted through a plurality of trials in advance, and the longest time is taken as a preset third time period.

Step B402: the BMS acquires a control right to become a server, and uses a preset server ID (for example, 0x55) as a frame ID for subsequently transmitting data.

Step B403: if the server receives a data packet for requesting the server to allocate an ID, returning, by the server, an allocated unique ID based on a frame ID in the data packet, and adding the allocated unique ID to a client list.

Step B404: transmitting, by the server, the query packet to the CAN bus at a preset query time interval, and the preset query time interval is less than a preset first time period; for a client that returns a voltage value within the preset third time period, recording, by the server, the voltage value into the client list; for a client that does not return a voltage value within the preset third time period, deleting, by the server, the client from the client list.

In the present embodiment, the server maintains a client list, in which the ID of the client currently on-line and the voltage value of the corresponding battery pack are recorded, and if a client fails to return the voltage value within a preset third period of time, the server considers that the client has been away from the access to the CAN bus, thereby deleting the ID of the client and the voltage value of the corresponding battery pack from the list.

Step B405: if the server receives a data packet for requesting a control right, returning, by the server, a control right conflict indication packet based on a frame ID in the data packet; proceed to step B403.

In an alternative embodiment, steps B406 and B407 are further included:

step B406: when discharging is required, the server transmits a control instruction according to the voltage of a battery pack corresponding to the server and the voltage of a battery pack corresponding to each client in the client list to successively turn on discharging switches of the battery packs corresponding to each BMS in an order of the voltages from high to low.

Step B407: when charging is required, the server transmits a control instruction according to the voltage of a battery pack corresponding to the server and the voltage of a battery pack corresponding to each client in the client list to successively turn on charging switches of the battery packs corresponding to each BMS in an order of the voltages from low to high.

Although the foregoing embodiments have described the steps in the foregoing sequence, a person skilled in the art will understand that, in order to achieve the effect of the present embodiment, different steps are not necessarily performed in such a sequence, and may be performed simultaneously (in parallel) or in an inverse sequence, and these simple variations are within the scope of the present disclosure.

A person skilled in the art will appreciate that the method steps of the examples described in connection with the embodiments disclosed herein may be implemented as electronic hardware, computer software, or combinations of both, and that the components and steps of the examples have been described generally in terms of their functionality in the foregoing description for the purpose of clearly illustrating the interchangeability of electronic hardware and software. Whether such functionality is implemented as electronic hardware or software depends upon the particular application and design constraints imposed on the implementation. A person skilled in the art may implement the described functionality in varying ways for each particular application, but such implementation should not be interpreted as exceeding the scope of the present disclosure.

So far, the technical solutions of the present disclosure have been described with reference to the preferred embodiments shown in the accompanying drawings. However, a person skilled in the art will readily appreciate that the scope of the present disclosure is obviously not limited to these specific embodiments. Equivalent changes or substitutions may be made by a person skilled in the art to the relevant features without departing from the principles of the present disclosure, and all such changes or substitutions are intended to be within the scope of the present disclosure.

What is claimed is:

1. A method for networking a plurality of power battery packs via a Controller Area Network (CAN) bus, wherein each of the plurality of power battery packs is provided with an independent BATTERY MANAGEMENT SYSTEM (BMS), and the method comprises:
    waking up a first BMS to monitor the CAN bus;
    transmitting, by the first BMS, a network access request to a server when the first BMS receives a query packet within a preset first time period; wherein the query packet is transmitted by a second BMS currently serving as a server for querying a voltage of a battery pack corresponding to other BMSs; and
    when the first BMS does not receive the query packet within the preset first time period, transmitting, by the first BMS, a control request to the other BMSs;
    wherein the transmitting the network access request comprises:
        waiting, by the first BMS, for a first random duration, generating a frame identification (ID) according to a voltage of a battery pack corresponding to the first BMS, and transmitting a data packet to the server for requesting the server to allocate an ID; and
        when the first BMS receives an allocated ID within a preset second time period, the first BMS becomes a client and uses the allocated ID as the frame ID for subsequently transmitting data;
    wherein the transmitting the control request comprises:
        waiting, by the first BMS, for a second random duration, generating the frame ID according to the voltage of the battery pack corresponding to the first BMS, and transmitting the data packet to the other BMSs for requesting a control right; and
        when the first BMS does not receive a control right conflict indication packet within a preset third time period, the first BMS acquires the control right to become a server, and uses a preset server ID as the frame ID for subsequently transmitting data.

2. The method for networking a plurality of power battery packs via a CAN bus according to claim 1, wherein, after transmitting, by the first BMS, the data packet to the server for requesting the server to allocate the ID, the method further comprises:
    performing, by the first BMS, transmitting the network access request again when the BMS receives an ID conflict indication packet; and
    performing, by the first BMS, transmitting the network access request again when the BMS does not receive the allocated ID within the preset second time period.

3. The method for networking a plurality of power battery packs via a CAN bus according to claim 2, wherein, after the first BMS becomes the client and uses the allocated ID as the frame ID for subsequently transmitting data, the method further comprises:
    when the client receives the data packet for requesting to allocate an ID transmitted by the other BMSs with a source address same as an ID of the client, returning, by the client, an ID conflict indication packet based on the source address of the data packet.

4. The method for networking a plurality of power battery packs via a CAN bus according to claim 3, wherein, after the first BMS becomes the client and uses the allocated ID as the frame ID for subsequently transmitting data, the method further comprises:
    obtaining, by the client, a voltage value of a battery pack corresponding to the client and transmitting the voltage value to the server when the client receives the query packet within the preset first time period; and
    when the client does not receive the query packet within the preset first time period, performing, by the client, the transmitting the control request.

5. The method for networking a plurality of power battery packs via a CAN bus according to claim 1, wherein, after the transmitting the control request, the method further comprises:
    performing, by the first BMS, the transmitting the network access request, when the first BMS receives the control right conflict indication packet within the preset third time period.

6. The method for networking a plurality of power battery packs via a CAN bus according to claim 5, wherein, after the first BMS acquires the control right to become the server, and uses the preset server ID as the frame ID for subsequently transmitting data, the method further comprises:
    when the server receives a data packet for requesting the server to allocate the ID, returning, by the server, an allocated unique ID based on the frame ID in the data packet, and adding the allocated unique ID to a client list.

7. The method for networking a plurality of power battery packs via a CAN bus according to claim 4, wherein, after the first BMS acquires the control right to become the server, and uses the preset server ID as the frame ID for subsequently transmitting data, the method further comprises:
    transmitting, by the server, the query packet to the CAN bus at a preset query time interval, wherein the preset query time interval is less than the preset first time period;
    for a client that returns the voltage value within the preset third time period, recording, by the server, the voltage value into a client list; and for a client that does not return the voltage value within the preset third time period, deleting, by the server, the client from the client list.

8. The method for networking a plurality of power battery packs via a CAN bus according to claim 7, wherein,
after the first BMS acquires the control right to become the server, and uses the preset server ID as the frame ID for subsequently transmitting data, the method further comprises:
when the server receives a data packet for requesting the control right, returning, by the server, the control right conflict indication packet based on the frame ID in the data packet.

9. The method for networking a plurality of power battery packs via a CAN bus according to claim 8, further comprising:
when the plurality of power battery packs are required to be discharged, transmitting, by the server, a control instruction to the BMSs according to a voltage value of a battery pack corresponding to the server and voltage values of the battery packs corresponding to clients in the client list to successively turn on discharging switches of the plurality of power battery packs corresponding to the BMSs in an order of the voltage values from high to low; and
when the plurality of power battery packs are required to be charged, transmitting, by the server, the control instruction to the BMSs according to the voltage value of the battery pack corresponding to the server and the voltage values of the battery packs corresponding to the clients in the client list to successively turn on charging switches of the plurality of power battery packs corresponding to the BMSs in an order of the voltage values from low to high.

10. The method for networking a plurality of power battery packs via a CAN bus according to claim 1, wherein,
the first random duration and the second random duration are both within a preset time range; and
the generating the frame ID according to the voltage of the battery pack corresponding to the first BMS comprises:
acquiring, by the first BMS, a voltage value of the battery pack corresponding to the first BMS; and
generating, by the BMS, the frame ID according to the voltage value and a preset ID range.

* * * * *